US006342279B1

(12) United States Patent
Tarumi et al.

(10) Patent No.: US 6,342,279 B1
(45) Date of Patent: *Jan. 29, 2002

(54) ELECTRO-OPTICAL LIQUID-CRYSTAL

(75) Inventors: Kazuaki Tarumi, Seeheim-Jugenheim; Andreas Beyer, Hanau; Anja Huth, Grafing; Eike Poetsch, Muhltal; Michael Kompter, Riedstadt, all of (DE)

(73) Assignee: Merck Patent Gesellschaft mit Beschrankter Haftung (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/728,370

(22) Filed: Oct. 10, 1996

(30) Foreign Application Priority Data

Oct. 11, 1995 (DE) ......................... 195 37 802

(51) Int. Cl.$^7$ ........................ C09K 19/34; C09K 19/30; C09K 19/20; G02F 1/13
(52) U.S. Cl. ............. 428/1.1; 252/299.61; 252/299.63; 252/299.64; 252/299.66; 252/299.67
(58) Field of Search ................. 252/299.01, 299.63, 252/299.64, 299.66, 299.67, 299.61; 428/1.1

(56) References Cited

U.S. PATENT DOCUMENTS

| | | | | |
|---|---|---|---|---|
| 5,919,396 A | * | 7/1999 | Tarumi et al. | 252/299.01 |
| 5,976,407 A | * | 11/1999 | Tarumi et al. | 252/299.01 |
| 5,993,691 A | * | 11/1999 | Pausch et al. | 252/299.63 |
| 6,045,878 A | * | 4/2000 | Tarumi et al. | 428/1.1 |

FOREIGN PATENT DOCUMENTS

| | | | |
|---|---|---|---|
| EP | 0 387 032 | | 3/1990 |
| EP | 0 464 648 | | 6/1991 |
| EP | 0 492 222 | | 12/1991 |
| EP | 0 502 406 | | 2/1992 |
| EP | 0 507 094 | | 3/1992 |
| EP | 0 667 555 | | 2/1995 |
| EP | 673986 | * | 9/1995 |
| JP | 58-210057 | | 12/1983 |
| JP | 60-197651 | * | 10/1985 |
| JP | 61-64785 | * | 4/1986 |
| JP | 04 279 560 | | 5/1992 |
| JP | 07 181 439 | | 7/1995 |

OTHER PUBLICATIONS

Caplus 1986:635975.*
Caplus 1986:139864.*
Abstract of JP 4–279560.

* cited by examiner

Primary Examiner—Shean C. Wu
(74) Attorney, Agent, or Firm—Millen, White, Zelane, & Branigan, P.C.

(57) ABSTRACT

The invention relates to an electrooptical liquid-crystal display having a realignment layer for realigning the liquid crystals, where the field thereof has a significant component parallel to the liquid-crystal layer, containing a liquid-crystalline medium having positive dielectric anisotropy, where the medium comprises at least one mesogenic compound which contains a group of the formula I

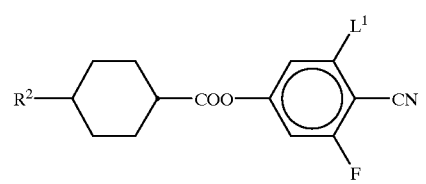

I and at least one compound of formula II

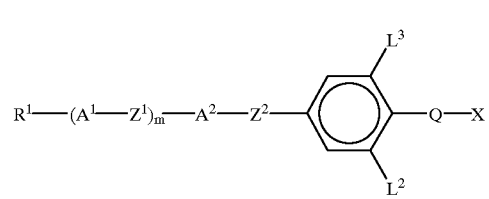

II wherein $L^1$ is H or F; $R^1$ $R^2$ are H, an alkyl or alkenyl radical having 1 to 15 carbon atoms which may be substituted; Q is a radical of the formula $-(O)_q(CH_2)_r-(CF_2)_s-$ in which q is 0 or 1; r is 0 or an integer of 1 to 6, and s is an integer of 0 to 6; X is F or Cl, and in the case where s ≠0, is alternatively H, and A1 and A2 are each, independently of one another, a 1,4-cyclohexenylene or trans-1,4-cyclohexylene which may be substituted; 1,4-phenylene in which may be substituted, 1,4-bicyclo[2.2.2]octylene, piperidine-1,4-diyl, naphthalene-2,6-diyl, decahydronaphthalene-2,6-diyl and 1,2,3,4 tetrahydronaphthalene-2,6-diyl, which may be substituted; $L_2$ and $L_3$ are each, independently of one another, H or F; $Z_1$ and $Z_2$ are each, independently of one another, $-CO-O-$, $-O-CO-$, $-CH_2O-$, $-OCH_2-$, $-CH_2CH_2-$, $-CH=CH-$, $-C\equiv C-$ or a single bond, or one of the radicals $Z^1$ and $Z^2$ is alternatively $-(CH_2)_4-$ or $-CH=CH-CH_2CH_2-$, and m is 0, 1 or 2.

19 Claims, No Drawings

ELECTRO-OPTICAL LIQUID-CRYSTAL

SUMMARY OF THE INVENTION

The invention relates to an electro-optical liquid-crystal display having a realignment layer for realigning the liquid crystals, where the field thereof has a significant component parallel to the liquid-crystal layer, containing a liquid-crystalline medium having positive dielectric anisotropy, where the medium comprises at least one mesogenic compound which contains a group of the formula I*

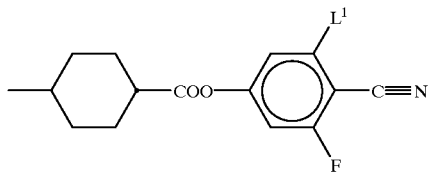

in which
$L^1$ is H or F.

In conventional liquid-crystal displays (TN, STN, OMI and AMD-TN), the electric fields for realignment are produced essentially perpendicular to the liquid-crystal layer.

International Patent Application WO 91/10936 discloses a liquid-crystal display in which the electric signals are produced in such a way that the electric fields have a component, suitably a significant parallel component, to the liquid-crystal layer (IPS, in-plane switching). The principles of operating such a display are described, for example, by R. A. Soref in Journal of Applied Physics, Vol. 45, No. 12, pp. 5466–5468 (1974).

EP 0 588 568 discloses various ways of addressing such a display.

These IPS displays can be operated with liquid-crystalline materials either having a positive or a negative dielectric anisotropy ($\Delta\epsilon \neq 0$). However, with the materials known hitherto, IPS displays have relatively high threshold voltages and long response times. The object was therefore to indicate liquid-crystalline materials which are suitable for achieving relatively low threshold voltages and short response times in IPS displays.

Surprisingly, this object has been achieved by using liquid-crystalline materials which comprise at least one compound which contains a laterally fluorinated 4-(cyclohexylcarbonyloxy)benzonitrile group.

Such compounds are disclosed, for example, in JP 58-210 057 and JP 4-279 560.

However, these specifications give no indication that these substances can be used to improve the threshold voltages and the response times of IPS displays.

The invention thus relates to an electro-optical liquid-crystal display having a realignment layer for realigning the liquid crystals, where the field thereof has a significant component parallel to the liquid-crystal layer, comprising a liquid-crystalline medium having positive dielectric anisotropy, where the medium comprises at least one mesogenic compound which contains a group of the formula I*

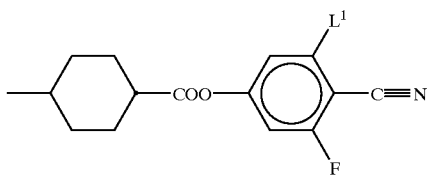

in which
$L^1$ is H or F.

Suitable mesogenic compounds typically include (but are not limited to) those having 2–4 ring groups connected in series by bridge groups, single bonds or combinations thereof, wherein terminal ring groups exhibit wing groups. Suitable ring groups include a 1,4-cyclohexenylene or trans-1,4-cyclohexylene radicals in which, in addition, one or more non-adjacent $CH_2$ groups may be replaced by —O— and/or —S—; 1,4-phenylene radicals in which, in addition, one or two CH groups may be replaced by N; or radicals from the group consisting of 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl. Ring groups, preferably 1,4-cyclohexylene or 1,4-phenylene, may be substituted, e.g., by one or more fluorine atoms.

Suitable bridge groups include, but are not limited to,: —CO—O—, —O—CO—, —CH$_2$O—, —OCH$_2$—, —CH$_2$CH$_2$—, —CH=CH—, —C≡C —, a single bond, —(CH$_2$)$_4$— or —CH=CH—CH$_2$CH$_2$—.

Suitable wing groups include:
H, an alkyl or alkenyl radical having 1 to 15 carbon atoms which is unsubstituted, monosubstituted by CN or CF$_3$ or at least monosubstituted by halogen, up to perhalo, wherein addition one or more CH$_2$ groups in these radicals may each, independently of one another be replaced by —O—, —S—,

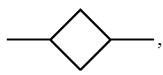

—CO—, —CO—O— —O—CO— or —O—CO—C— in such a way that O atoms are not linked directly to one another.

The compound containing the group I* is suitably present in an amount of, e.g., 5–30%, preferably 7–20% by weight, although suitable amounts beyond these ranges are possible and routinely determinable.

Preferred embodiments are IPS displays in which
a) the medium comprises at least one compound of the formula II

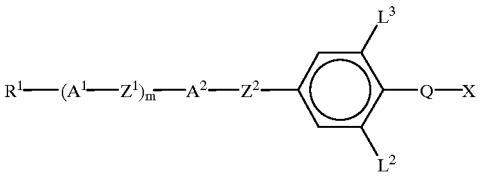

in which
$R^1$ is H, an alkyl or alkenyl radical having 1 to 15 carbon atoms which is unsubstituted, monosubstituted by CN or CF$_3$ or at least monosubstituted by halogen, up to perhalo, where, in addition, one or more CH$_2$ groups in these radicals may each, independently of one another, be replaced by —O—, —S—,

—CO—, —CO—O—, —O—CO— or —O—CO—O— in such a way that O atoms are not linked directly to one another,
Q is a radical of the formula

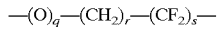

in which
q is 0 or 1,
r is 0 or an integer between 1 and 6, and
s is an integer between 0 and 6,
X is F or Cl, and, in the case where s≠0, is alternatively H, and
$A^1$ and $A^2$ are each, independently of one another,
(a) a 1,4-cyclohexenylene or trans-1,4-cyclo-hexylene radical in which, in addition, one or more non-adjacent $CH_2$ groups may be replaced by —O— and/or —S—,
(b) a 1,4-phenylene radical in which, in addition, one or two CH groups may be replaced by N,
(c) a radical from the group consisting of 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl,
where the radicals (a) and (b) may be substituted by one or two fluorine atoms,
$L^2$ and $L^3$ are each, independently of one another, H or F.
$Z^1$ and $Z^2$ are each, independently of one another, —CO—O—, —O—CO—, —CH$_2$O—, —OCH$_2$—, —CH$_2$CH$_2$—, —CH=CH—, —C≡C— or a single bond, or one of the radicals $Z^1$ and $Z^2$ is alternatively —(CH$_2$)$_4$— or —CH=CH—CH$_2$CH$_2$—, and
m is 0, 1 or 2;
b) the medium comprises at least one compound of the formula I

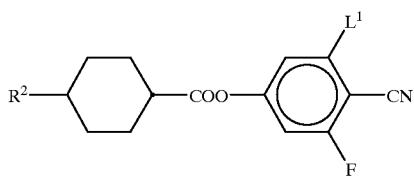

in which
$L^1$ is H or F, and
$R^2$ is as defined for $R^1$;
c) the medium has a dielectric anisotropy Δε of >8.5, preferably between 8.6 and 14, in particular between 8.7 and 13.5;
d) the medium comprises at least one compound of the formula III

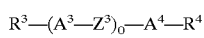

in which
$R^3$ and $R^4$ are each, independently of one another, as defined for $R^1$, $A^3$ and $A^4$ are each, independently of one another, as defined for $A^1$ and $A^2$,
$Z^3$, is in each case independently of the others, as defined for $Z^1$ and $Z^2$ and,
O is 1, 2 or 3; or
e) the medium comprises at least one compound of the formula IV

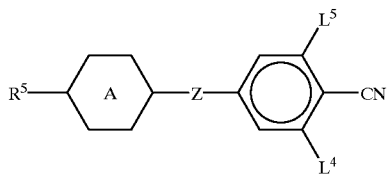

in which
$R^5$ is as defined for $R^1$,

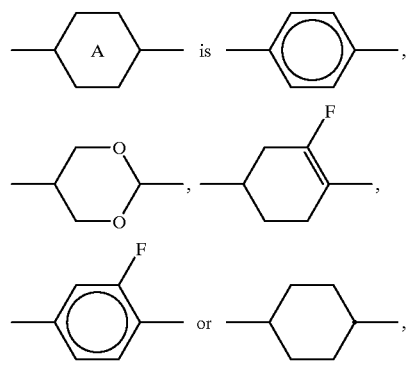

Z is a single bond or —COO—, and
$L^4$ and $L^5$ are each F or H,
but not of the formula I.
Particular preference is given to an IPS display in which the pixels are addressed by means of an active matrix.
The invention furthermore relates to a liquid-crystalline medium having positive dielectric anisotropy which comprises at least one compound of the formula II and at least one compound containing a group of the formula I*, e.g., a compound of formula I, in particular which preferably comprises, e.g., from about 60 to 95% by weight, more preferably from 70 to 90% by weight, of at least one compound of the formula II, from about 5 to 30% by weight, more preferably from 7 to 20% by weight, of at least one compound of the formula I, from about 5 to 20% by weight, more preferably from 7 to 15% by weight, of at least one compound of the formula III, from about 1 to 10% by weight, more preferably from 2 to 8% by weight, of at least one compound of the formula IV.

The medium preferably comprises at least one compound selected from the formulae IIa, IIb and IIc:

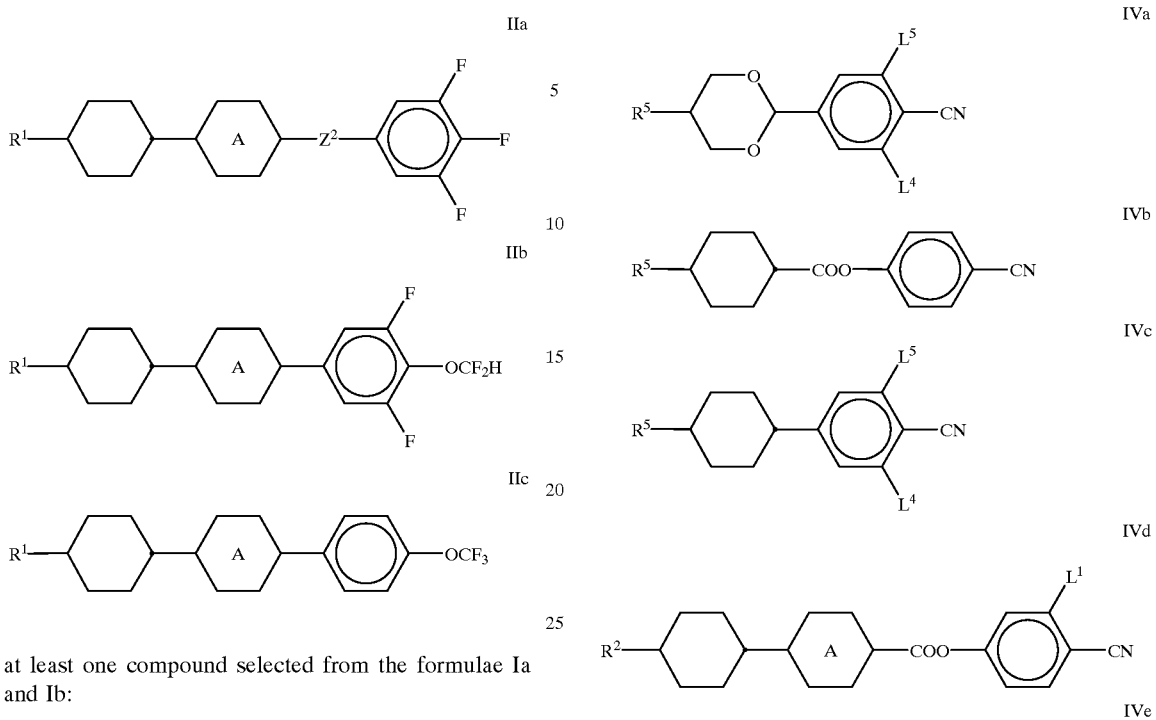

at least one compound selected from the formulae Ia and Ib:

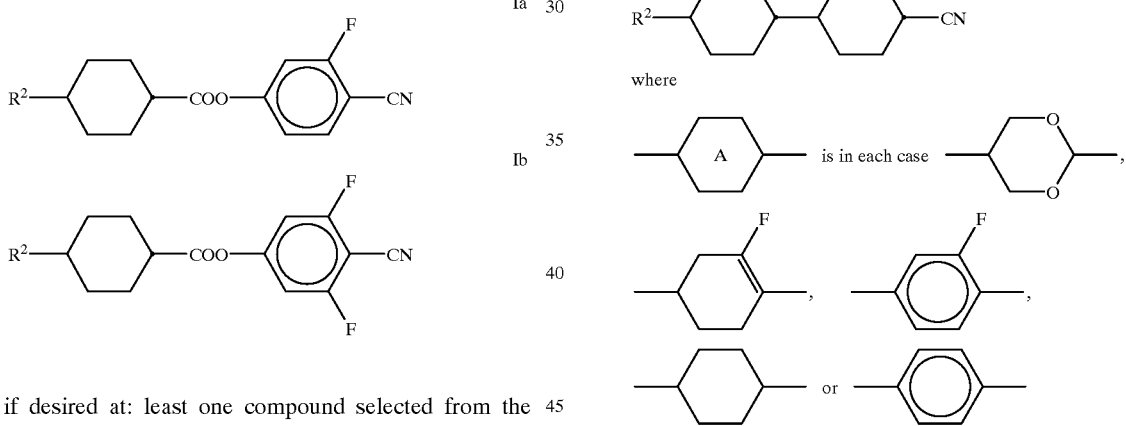

if desired at: least one compound selected from the formulae IIIa, IIIb and IIIc:

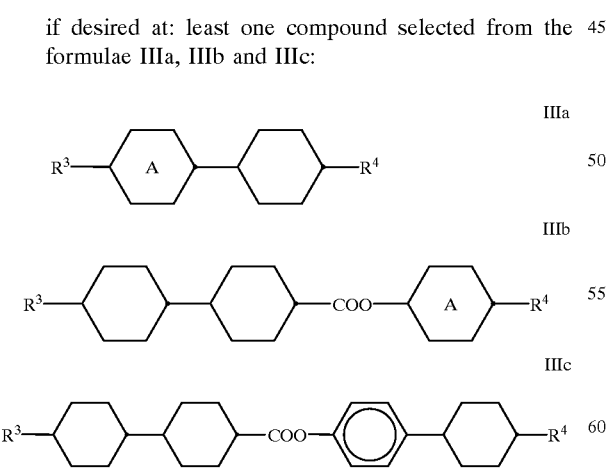

and
at least one compound selected from the formulae IVa to IVe:

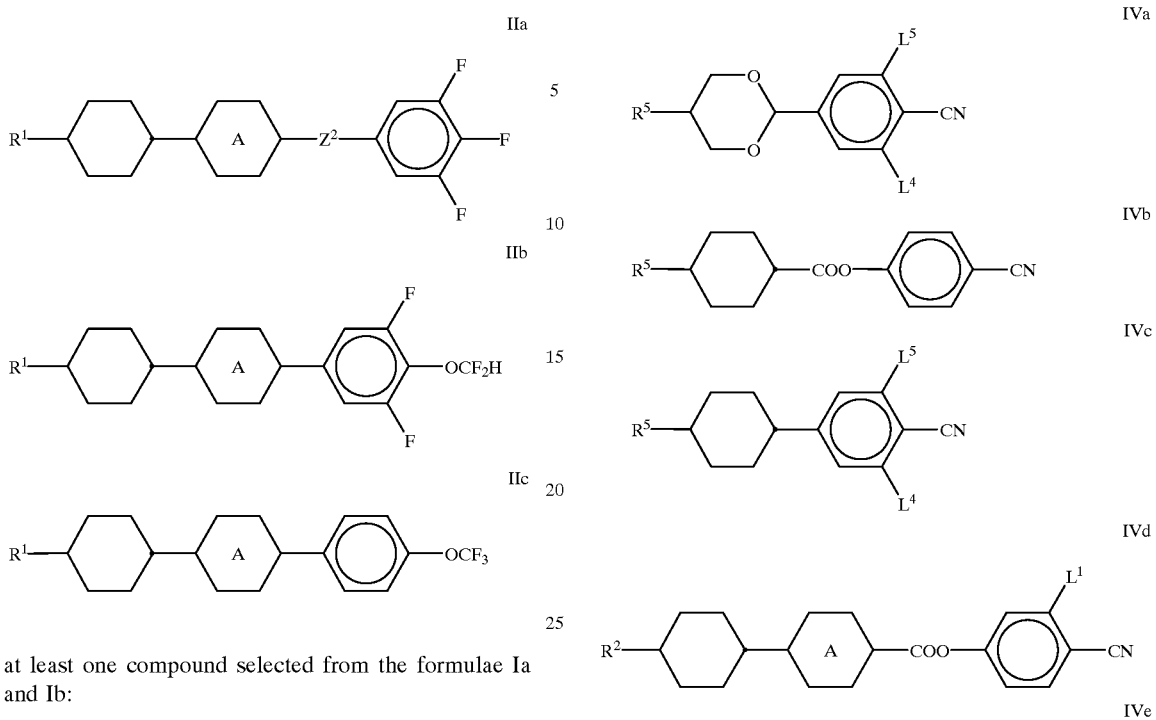

where

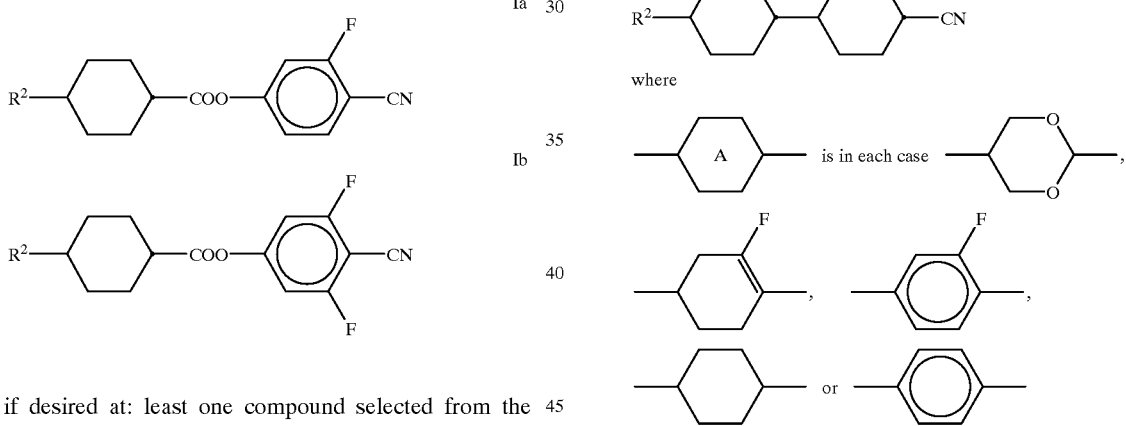

is in each case and
$Z^2$ is —COO—, —CH$_2$CH$_2$— or a single bond, and
$R^1$, $R^2$, $R^3$, $R^4$, $R^5$, $L^1$ to $L^5$ are as defined in each case.

The novel liquid-crystalline media generally have a birefringence ($\Delta n$) of <0.12, preferably between 0.07 and 0.1, in particular between 0.075 and 0.09.

The flow viscosity (at 20° C.) of the novel materials is generally less than 30 mm$^2$ s$^{-1}$, in particular between 15 and 25 mm$^2$·s$^{-1}$. The rotational viscosity of the novel media is generally less than 200 mPa·s, preferably less than 150 mPa·s, in particular between 80 and 120 mPa·s. The resistivity of the novel materials is generally between 5×10$^{10}$ and 5×10$^{13}$ Ω·cm$^{-1}$ at 20° C.

It has been found that even a relatively small proportion of the cyclohexanecarbonyloxybenzonitrile compounds mixed with conventional liquid-crystal materials, but in particular with one or more compounds of the formula II, III and/or IV, results in a significant reduction in the threshold voltage and in fast response times, and at the same time broad nematic phases having low smectic-nematic transition temperatures are observed. The compounds of the formulae I to IV are colorless, stable and readily miscible with one another and with other liquid-crystal materials.

Suitable "alkyl" moieties are, but not limited to, straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

Suitable "alkenyl" moieties are, but not limited to, straight-chain and branched alkenyl groups having 2–7 carbon atoms, in particular the straight-chain groups. Exemplary alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

Alkyl-substituted by halogen, i.e., "haloalkyl", preferably covers straight-chain groups containing terminal halogen, preferably fluorine, i.e., fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

Alkyl in which one or more $CH_2$ groups are replaced by —O—, i.e., "oxaalkyl" preferably covers straight-chain radicals; of the formula $C_nH_{2n+1}$—O—$(CH_2)_m$, in which n and m are each, independently of one another, from i to 6. n is preferably 1 and m is preferably from 1 to 6.

Through a suitable choice of the meanings of $R^1$ to $R^5$, the addressing times, the threshold voltage, the steepness of the transmission characteristic lines, etc., can be modified as desired. For example, 1E-alkenyl radicals, 3E-alkenyl radicals, 2E-alkenyloxy radicals and the like generally result in shorter addressing times, improved nematic tendencies and a higher ratio between the elastic constants $k_3$, (bend) and $k_{11}$ (splay) compared with alkyl and alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$— group in $Z^1$ or $Z^2$ generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio between the compounds of the formulae I and II+III+IV depends substantially on the desired properties, on the choice of the components of the formulae I, II, III and/or IV and on the choice of further optional components. Suitable mixing ratios within the above range can easily be determined from case to case.

The total amount of compounds of the formulae I to IV in the novel mixtures is not crucial. The mixtures can therefore contain one or more further components in order to optimize the various properties. However, the observed effect on the addressing times and on the threshold voltage is generally greater the higher the total concentration of compounds of the formulae I and II.

In a particularly preferred embodiment, the novel media comprise compounds of the formula II in which Q—X is F, $OCF_3$ or $OCHF_2$. A favorable synergistic action with the compounds of the formula I results in particularly favorable properties.

The novel liquid-crystalline media preferably comprise 2 to 40, in particular 4 to 30, components as further constituents besides one or more compounds of the formulae I, II, III and IV. These media very particularly preferably contain 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexyl-cyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-bis-cyclohexylbenzenes, 4,4.'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclo hexyl)ethanes, 1-cyclohexyl-2-biphenylylethanes, 1-phenyl-2-cyclohexylphenylethanes optionally halogenated stilbenes, benzyl phenyl ethers, tolans and substituted cinnamic acids. The 1,4-phenylene groups in these compounds may also be fluorinated.

The most important compounds suitable as further constituents of novel media can be characterized by the formulae 1, 2, 3, 4 and 5:

| | |
|---|---|
| R'—L—E—R" | 1 |
| R'—L—COO—E—R" | 2 |
| R'—L—OOC—E—R" | 3 |
| R'—L—$CH_2CH_2$—E—R" | 4 |
| R'—L—C≡C—E—R" | 5 |

In the formulae 1, 2, 3, 4 and 5, R' and R" are each independently selected from one of the definitions of $R^1$. L and E, which may be identical or different, are in each case, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclo-hexylene or 1,4-cyclohexylene, Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5diyl, pyridine-2,5-diyl or 1,3-dioxane-2,5-diyl.

One of the radicals L and E is preferably Cyc, Phe or Pyr. E is preferably Cyc, Phe or Phe—Cyc. The novel media preferably contain one or more components selected from the compounds of the formulae 1, 2, 3, 4 and 5 in which L and E are selected from the group comprising Cyc, Phe and Pyr and simultaneously one or more components selected from the compounds of the formulae 1, 2, 3, 4 and 5 in which one of the radicals L and E is selected from the group comprising Cyc, Phe and Pyr and the other radical is selected from the group comprising -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group comprising -Phe-Cyc-, -Cyc-Cyc-, -G-Phe- and -G-Cyc-.

In a smaller sub-group of the compounds of the formulae 1, 2, 3, 4 and 5, R' and R" are in each case, independently of one another, alkyl, alkenyl, alkoxy, alkoxyalkyl, alkenyloxy or alkanoyloxy having up to 8 carbon atoms. This smaller sub-group is called group A below, and the compounds are labelled with the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5 which is known as group B, R" is —F, —Cl, —NCS or —(O)$_i$CH$_{3-(k+1)}$F$_k$Cl$_1$, where i is 0 or 1, and k+l is 1, 2 or 3; the compounds in which R" has this meaning are labelled with the sub-formulae 1b, 2b, 3b, 4b and 5b. Particular preference is given to those compounds of the sub-formulae 1b, 2b, 3b, 4b and 5b in which R" is —F, —Cl, —NCS, —CF$_3$, —OCHF$_2$ or —OCF$_3$.

In the compounds of the sub-formulae 1b, 2b, 3b, 4b and 5b, R' is as defined for the compounds of the sub-formulae 1a–5a and is preferably alkyl, alkenyl, alkoxy or alkoxyalkyl.

In a further smaller sub-group of the compounds of the formulae 1, 2, 3, 4 and 5, R" is —CN; this sub-group is known as group C below, and the compounds of this sub-group are correspondingly described by sub-formulae 1c, 2c, 3c, 4c and 5c. In the compounds of the sub-formulae 1c, 2c, 3c, 4c and 5c, R' is as defined for the compounds of the sub-formulae 1a–5a and is preferably alkyl, alkoxy or alkenyl.

In addition to the preferred compounds of groups A, B and C, other compounds of the formulae 1, 2, 3, 4 and 5 having other variants of the proposed substituents are also customary All these substances can be obtained by methods which are known from the literature or analogously thereto.

Besides novel compounds of the formula I, the media according to the invention preferably comprise one or more compounds selected from group A and/or group B and/or group C. The proportions by weight of the compounds from these groups in the novel media are preferably Group A: 0 to 90%, preferably 20 to 90%; in particular 30 to 90%

Group B: 0 to 80%, preferably 10 to 80%, in particular 10 to 65%

Group C: 0 to 80%, preferably 5 to 80%, in particular 5 to 50%, the sum of the proportions by weight of the group A and/or B and/or C compounds present in the particular media according to the invention preferably being 5% to 90% and in particular 10% to 90%.

The novel media preferably comprise 1 to 40%, particularly preferably 5 to 30%, of compounds according to the invention. Further preferred media are those which comprise more than 40%, in particular 45 to 90%, of compounds according to the invention. The media preferably comprise three, four or five compounds according to the invention.

The structure of the novel IPS display corresponds to the construction which is conventional for such displays, as described, for example, in WO 91/10936 or EP 0 588 568. The term conventional construction here is broadly drawn and also covers all derivatives and modifications of the IPS display, in particular, for example, also matrix display elements based on poly-Si, TFT or MIM.

However, an important difference between the novel displays and the conventional ones is in the choice of the liquid-crystal parameters of the liquid-crystal layer.

The liquid-crystal mixtures which can be used in accordance with the invention are prepared in a manner which is conventional per se. In general, the desired amount of the components used in the lesser amount is dissolved in the components making up the principal constituent, expediently at elevated temperature. It is also possible to mix solutions of the components in an organic solvent, for example in acetone, chloroform or methanol, and, after thorough mixing, to remove the solvent again, for example by distillation.

The dielectrics may also contain further additives known to the person skilled in the art and described in the literature. For example, 0–15% of pleochroic dyes or chiral dopants can be added.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German application No. 195 37 802.4, filed Oct. 11, 1995, is hereby incorporated by reference.

In the following discussion, C denotes a crystalline phase, S denotes a smectic phase, $S_B$ denotes a smectic B phase, N denotes a nematic phase and I denotes the isotropic phase.

$V_0$ denotes the voltage for 0% a transmission (viewing direction perpendicular to the plate surface). $t_{on}$ denotes the switch-on time and $t_{off}$ denotes the switch-off time. $V_{max}$ denotes the voltage at maximum transmission. $\Delta n$ denotes the optical anisotropy and $n_0$ denotes the refractive index (in each case 589 nm). $\Delta\epsilon$ denotes the dielectric anisotropy ($\Delta\epsilon=\epsilon_\parallel-\epsilon_\perp$, where $\epsilon_\parallel$ denotes the dielectric constant parallel to the long axes of the molecules and $\epsilon\perp$ denotes the dielectric constant perpendicular thereto). The electro-optical data were, measured in an IPS cell at 20° C., unless expressly stated otherwise. The optical data were measured at 20 C. unless expressly stated otherwise.

An IPS test cell as described in WO 91/10936 having a comb structure was used, where the electrodes were 20 μm apart.

The layer thickness d of the liquid-crystal material is 5 μm. The cell furthermore has:

| | |
|---|---|
| Initial twist angle: | 0° |
| Alignment angle: | 5° |
| Tilt angle: | 3° |

The cells; are dark in the "off" state.

In the present application and in the examples below, the structures of the liquid-crystal compounds are indicated by acronyms, the transformation into chemical formulae taking place as in Tables A and B below. All the radicals $C_nH_{2n+1}$ are straight-chain alkyl radicals containing n carbon atoms. The coding in Table B requires no further explanation. In Table A, only the acronym for the parent structure is given. In individual cases, a code follows for the substituents $R^1$, $R^2$, $L^1$ and $L^2$, separated from the acronym for the parent structure by a hyphen:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |

-continued

| Code for $R^1$, $R^2$, $L^1$, $L^2$ | $R^1$ | $R^2$ | $L^1$ | $L^2$ |
|---|---|---|---|---|
| nN.F | $C_nH_{2n+1}$ | CN | F | H |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_2H_{2s}$— | CN | H | H |
| nAm | $C_nH_{2n+1}$ | COOC$_m$H$_{2m+1}$ | H | H |
| nF.F.F | $C_nH_{2n+1}$ | F | F | F |
| nCl.F.F | $C_nH_{2n+1}$ | Cl | F | F |
| nCF$_3$.F.F | $C_nH_{2n+1}$ | CF$_3$ | F | F |
| nOCF$_3$.F.F | $C_nH_{2n+1}$ | OCF$_3$ | F | F |
| nOCF$_2$.F.F | $C_nH_{2n+1}$ | OCHF$_2$ | F | F |
| nOCF$_3$.F | $C_nH_{2n+1}$ | OCF$_3$ | F | H |
| nCN.F.F | $C_nH_{2n+1}$ | CN | F | F |
| nCN.F | $C_nH_{2n+1}$ | CN | F | H |

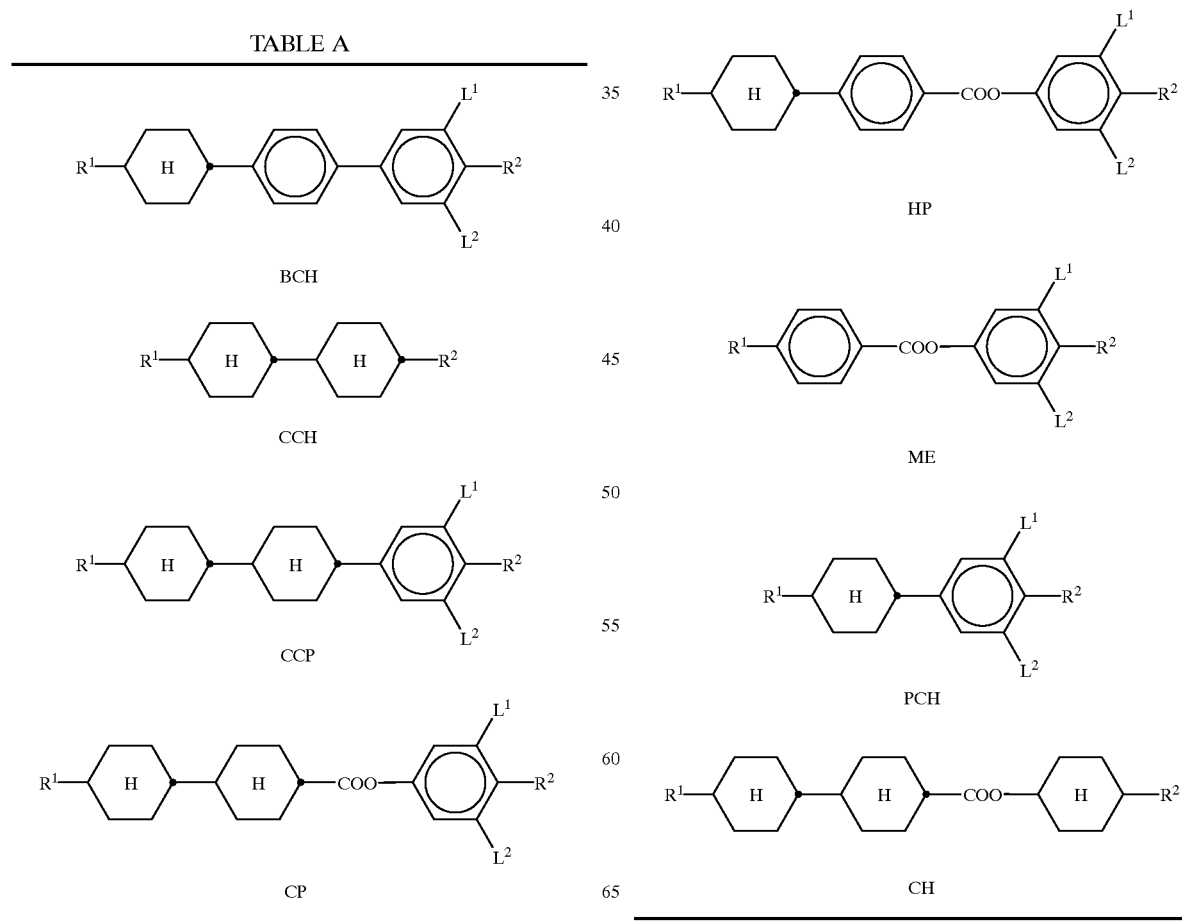

TABLE A

BCH

CCH

CCP

CP

TABLE A-continued

PDX

D

ECCP

HP

ME

PCH

CH

TABLE B

![CCP-nF.F.F structure: C_nH_{2n+1}—H—H—phenyl(3,4,5-trifluoro)]

CCP-nF.F.F

![BCH-nF.F.F structure: C_nH_{2n+1}—H—phenyl—phenyl(3,4,5-trifluoro)]

BCH-nF.F.F

EXAMPLES

Example 1

An IPS display contains a nematic mixture having

| clearing point | +76° C. |
|---|---|
| $\Delta n$ | 0.0776 |
| $n_o$ | 1.4725 |
| $\Delta\epsilon$ | +10.8 |
| $\epsilon_\perp$ | 4.4 |
| $K_1$ [$10^{-12}$ N] (20° C.) | 8.1 |
| $K_3$ [$10^{-12}$ N] (20° C.) | 12.9 |
| and comprising | |
| PCH-3 | 5.00 |
| CCP-2F.F.F | 13.00 |
| CCP-3F.F.F | 9.00 |
| CCP-5F.F.F | 9.00 |
| CCP-20CF$_3$ | 15.00 |
| CCP-30CF$_3$ | 14.00 |
| CCP-50CF$_3$ | 5.00 |
| D-3N.F.F | 12.00 |
| D-5N.F | 5.00 |
| CCH-34 | 8.00 |
| CCH-35 | 5.00 | and has high contrast and short response times.

The IPS displays of Example 1 are distinguished by a low addressing voltage and, in cells as in embodiment 1 of EP 0588 568, result in good voltage holding ratio values.

Comparative Example

An IPS display contains a nematic mixture having

| clearing point | 64° C. |
|---|---|
| $\Delta n$ | 0.0813 |
| $\Delta\epsilon$ | +12.0 | and comprising

| ME2N.F | 4.00 |
|---|---|
| ME3N.F | 4.00 |

-continued

| ME5N.F | 10.00 |
|---|---|
| ME7N.F | 6.00 |
| CCH-2 | 12.00 |
| CCH-3 | 12.00 |
| CCH-4 | 12.00 |
| CCP-30CF3 | 6.00 |
| CCP-50CF3 | 6.00 |
| CH-33 | 3.00 |
| CH-35 | 3.00 |
| CCH-34 | 10.00 |
| CCH-35 | 4.00 |
| CCH-303 | 4.00 |
| CCH-501 | 4.00 | and has a significantly lower clearing point, lower contrast and a longer response time than the display of Example 1.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium having positive dielectric anisotropy, comprising a mesogenic compound of formula I

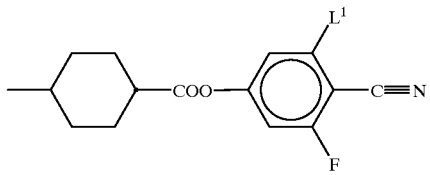

in which
L$^1$ is H or F, and,
at least one compound of formula II

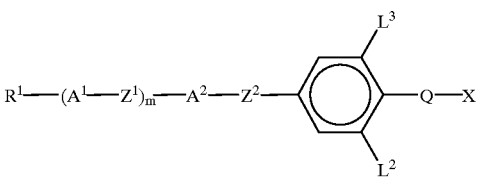

in which
R$^1$ is H, an alkyl or alkenyl radical having 1 to 15 carbon atoms which is unsubstituted, monosubstituted by CN or CF$_3$ or at least monosubstituted by halogen, where, in addition, one or more CH$_2$ groups in these radicals may each, independently of one another, be replaced by —O—, —S—,

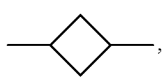

—CO—, —CO—O—, —O—CO— or —O—CO—O— in such a way that O atoms are not linked directly to one another, Q is a radical of the formula $$-(O)_q-(CEH_2)_r-(CF_2)_s-$$

in which
q is 0 or 1
r is 0 or an integer of 1 to 6, and
s is an integer of 0 to 6,
X is F or Cl, and in the case where s≠0, is alternatively H, and
$A^1$ and $A^2$ are each, independently of one another,
 (a) 1,4-cyclohexenylene or trans-1,4-cyclohexylene in which, in addition, one or more non-adjacent $CH_2$ groups may be replaced by —O— and/or —S—,
 (b) 1,4-phenylene in which, in addition, one or two CH groups may be replaced by N,
 (c) 1,4-bicyclo[2.2.2]octylene, piperidine-1,4-diyl, naphthalene-2,6-diyl, decahydronaphthalene-2,6-diyl and 1,2,3,4 tetrahydronaphthalene-2,6-diyl,
 where (a) and (b) may be substituted by one or two fluorine atoms,
$L^2$ and $L^3$ are each, independently of one another, H or F,
$Z^1$ and $Z^2$ are each, independently of one another, —CO—O—, —O—CO—, —CH$_2$O—, —OCH$_2$—, —CH$_2$CH$_2$—, —CH=CH—, —C≡C— or a single bond, or one of the radicals $Z^1$ and $Z^2$ is alternatively —(CH$_2$)$_4$—O or —CH=CH—CH$_2$CH$_2$—, and m is 0, 1 or 2,
and at least one compound selected from the group of compounds of formulae IIIa, IIIb, and IIIc $$R^3-\bigcirc-A-\bigcirc-R^4 \qquad IIIa$$

$$R^3-\bigcirc-\bigcirc-COO-\bigcirc-A-\bigcirc-R^4 \qquad IIIb$$

$$R^3-\bigcirc-\bigcirc-COO-\bigcirc-\bigcirc-R^4 \qquad IIIc$$

wherein
$R^3$ and $R^4$ are each, independently of one another, as defined for $R^1$, and —◯—A—◯— is, in each case, a dioxane ring or a fluorinated cyclohexene ring.

2. A liquid-crystal medium according to claim 1, further comprising at least one compound of formula III'

$$R^3-(A^3-Z^3)_o-A^4-R^4 \qquad III'$$

in which
$R^3$ and $R^4$ are each, independently of one another, H, an alkyl or alkenyl radical having 1 to 15 carbon atoms which is unsubstituted, monosubstituted by CN or $CF_3$ or at least monosubstituted by halogen, where, in addition, one or more $CH_2$ groups in these radicals may each, independently of one another, be replaced by —O—, —S—,

◇,

—CO—, —CO—O—, —O—CO— or —O—CO—O— in such a way that O atoms are not linked directly to one another,
$A^3$ and $A^4$ are each, independently of one another,
 (a) 1,4-cyclohexenylene or trans-1,4-cyclohexylene in which, in addition, one or more non-adjacent $CH_2$ groups may be replaced by —O— and/or —S—,
 (b) 1,4-phenylene in which, in addition, one or two CH groups may be replaced by N,
 (c) 1,4-bicyclo [2.2.2]octylene, piperidine-1,4-diyl, naphthalene-2,6-diyl, decahydronaphthalene-2,6-diyl and 1,2,3,4-tetrahydronaphthalene-2,6-diyl,
 where (a) and (b) may be substituted by one or two fluorine atoms,
$Z^3$ is in each case, independently, —CO—O—, —O—CO—, —CH$_2$O—, —OCH$_2$—, —CH$_2$CH$_2$—, —CH=CH—, —C≡C— or a single bond, or one of the radicals $Z^1$ and $Z^2$ is alternatively —(CH$_2$)$_4$— or —CH=CH—CH$_2$CH$_2$—, and is 1, 2 or 3.

3. A liquid-crystalline medium according to claim 1, comprising
from 60 to 95% by weight of at least one compound of formula II,
from 5 to 30% by weight of at least one compound of formula I,
and further comprising from 5 to 20% by weight of at least one compound of formula III'

$$R^3-(A^3-Z^3)_o-A^4-R^4 \qquad III'$$

in which
$R^3$ and $R^4$ are each, independently of one another, as defined for $R^1$,
$A^3$ and $A^4$ are each, independently of one another, as defined for $A^1$ and $A^2$,
$Z^3$ is in each case independently of the others as defined for $Z^1$ and $Z^2$, and
o is 1, 2, or 3,
and additionally from 1 to 10% by weight of a compound of formula IV $$R^5-\bigcirc-A-Z-\bigcirc\substack{L^5\\L^4}-CN \qquad IV$$

in which
$R^5$ is as defined for $R^1$,

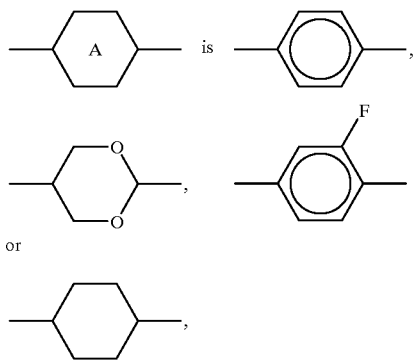

$L^4$ and $L^5$ are each H or F, but not of the formula I.

4. A liquid crystalline medium according to claim 3, comprising
   from 70 to 90% by weight of at least one compound of formula II,
   from 7 to 20% by weight of at least one compound of formula I,
   from 2 to 8% by weight of a compound of formula IV, and
   further comprising from 5 to 15% by weight of at least one compound of formula III'.

5. An electrooptical liquid-crystal display, comprising:
   a liquid-crystal layer and a realignment layer having a field with a component parallel to the liquid-crystal layer,
      said liquid-crystal layer comprising a liquid-crystalline medium having positive dielectric anisotropy, said medium containing a mesogenic compound of formula I

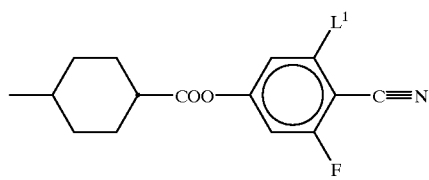
I in which
$L^1$ is H or F, and,
   at least one compound of formula II

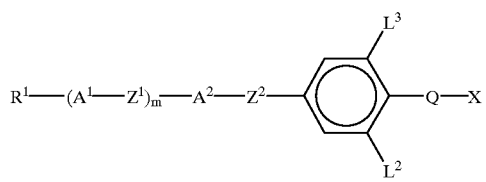
II in which
$R^1$ is H, an alkyl or alkenyl radical having 1 to 15 carbon atoms which is unsubstituted, monosubstituted by CN or $CF_3$ or at least monosubstituted by halogen, where, in addition, one or more $CH_2$ groups in these radicals may each, independently of one another, be replaced by —O—, —S—,

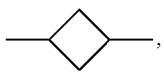

—CO—, —CO—O—, —O—CO— or —O—CO—O— in such a way that O atoms are not linked directly to one another, Q is a radical of the formula —(O)$_q$—(CH$_2$)$_r$—(CF$_2$)$_s$— in which
q is 0 or 1
r is 0 or an integer of 1 to 6, and
s is an integer of 0 to 6, X is F or Cl, and in the case where s≠0, is alternatively H, and $A^1$ and $A^2$ are each, independently of one another,
   (a) 1,4-cyclohexenylene or trans-1,4-cyclohexylene in which, in addition, one or more non-adjacent $CH_2$ groups may be replaced by —O— and/or —S—,
   (b) 1,4-phenylene in which, in addition, one or two CH groups may be replaced by N,
   (c) 1,4-bicyclo[2.2.2]octylene, piperidine-1,4-diyl, naphthalene-2,6-diyl, decahydronaphthalene-2,6-diyl and 1,2,3,4 tetrahydronaphthalene-2,6-diyl,
      where (a) and (b) may be substituted by one or two fluorine atoms, $L^2$ and $L^3$ are each, independently of one another, H or F, $Z^1$ and $Z^2$ are each, independently of one another, —CO—O—, —O—CO—, —CH$_2$O—, —OCH$_2$—, —CH$_2$CH$_2$—, —CH═CH—, —C≡C— or a single bond, or one of the radicals $Z^1$ and $Z^2$ is alternatively —(CH$_2$)$_4$— or —CH═CH—CH$_2$CH$_2$—, and m is 0, 1 or 2,
   and at least one compound selected from the group of compounds of formulae IIIa, IIIb, and IIIc

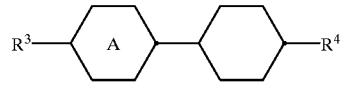
IIIa

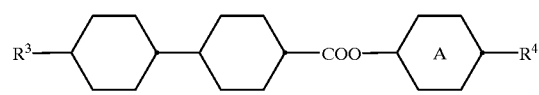
IIIb

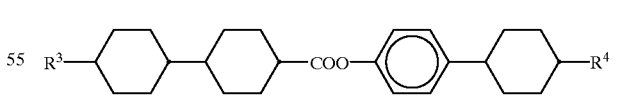
IIIc wherein
$R^3$ and $R^4$ are each, independently of one another, as defined for $R^1$, and

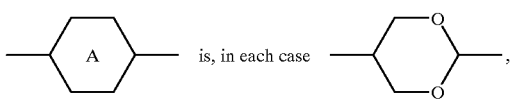

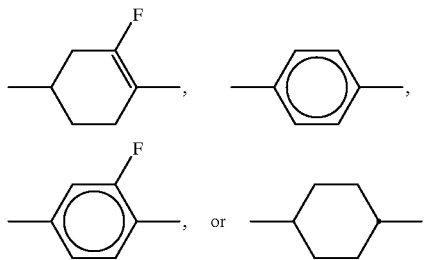

wherein said display employs in-plane switching.

6. A display as claimed in claim 5, wherein the at least one compound of formula IIIa, IIIb, and IIIc includes at least one compound of formula IIIa as formula CCH— nm

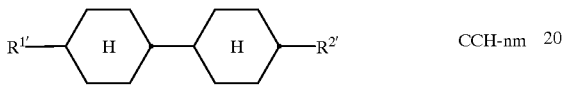

CCH-nm in which $R^{1\prime}$ is a straight chain alkyl radical of formula $C_{n'}H_{2n'+1}$, and $R^{2\prime}$ is a straight chain alkyl radical of formula $C_{m'}H_{2m'+1}$, and n' and m' are each independently 1 to 7.

7. A display as claimed in claim 1, wherein the at least one compound of formula II includes a compound of formula IIa

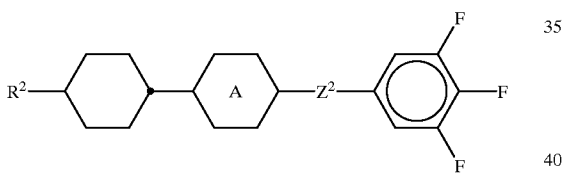

IIa in which $Z^2$ is —COO—, —CH$_2$CH$_2$— or a single bond, $R^2$ is H, an alkyl or alkenyl radical having 1 to 15 carbon atoms which is unsubstituted, monosubstituted by CN or CF$_3$ or at least monosubstituted by halogen, where, in addition, one or more CH$_2$ groups in these radicals may each, independently of one another, be replaced by —O—, —S—,

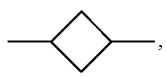

—CO—, —CO—O—, —O—CO— or —O—CO—O— in such a way that O atoms are not linked directly to one another, and

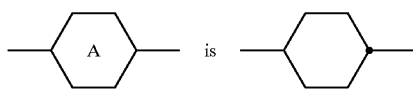

8. A display as claimed in claim 7, wherein $Z^2$ is a single bond.

9. A display as claimed in claim 8, wherein the at least one compound of formula IIa further includes at least one compound selected from the formulae CCP-nFFF and BCH-nFFF

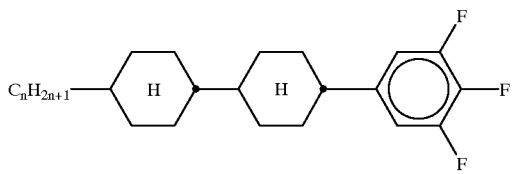

CCP——nFFF

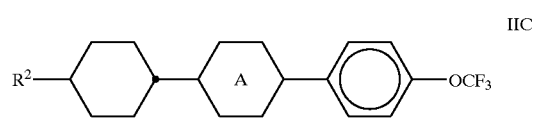

BCH——nFFF wherein $C_{n'}H_{2n'+1}$ is a straight chain alkyl radical, and n' is 1 to 7.

10. A display as claimed in claim 5, wherein the at least one compound of formula II includes at least one compound of formula IIC

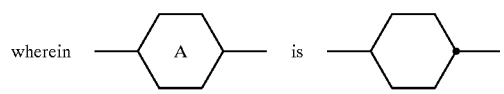

IIC wherein  is 

and $R^2$ is H, an alkyl or alkenyl radical having 1 to 15 carbon atoms which is unsubstituted, monosubstituted by CN or CF$_3$ or at least monosubstituted by halogen, where, in addition, one or more CH$_2$ groups in these radicals may each, independently of one another, be replaced by —O—, —S—, —CO—, —CO—O—, —O—CO— or —O—CO—O— in such a way that O atoms are not linked directly to one another.

11. A liquid-crystal display according to claim 5, wherein the medium comprises at least one compound of formula IV

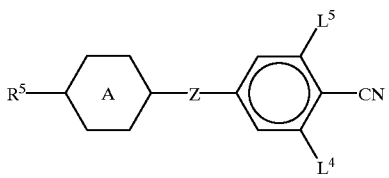

in which

R⁵ is H, an alkyl or alkenyl radical having 1 to 15 carbon atoms which is unsubstituted, monosubstituted by CN or CF₃ or at least monosubstituted by halogen, where, in addition, one or more CH₂ groups in these radicals may each independently of one another, be replaced by —O—, —S—,

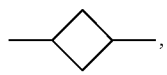

—CO—, —CO—O—, —O—CO— or —O—CO—O— in such a way that O atoms are not Linked directly to one another,

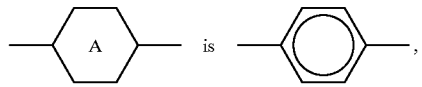

A is

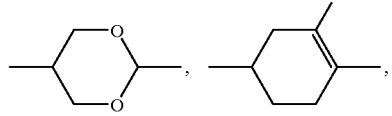

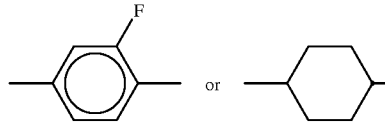

Z is a single bond or —COO—, and L⁴ and L⁵ are each, independently of one another, F or H, with the proviso that the compound of formula IV is different from the compound of formula I.

12. A display according to claim 5, having pixels that are addressed by means of an active matrix.

13. A display according to claim 5, wherein m is 1 and A¹ and A² are independently 1,4-cyclohexenylene or trans-1,4-cyclohexylene in which, in addition, one or more non-adjacent CH₂ groups may be replaced by —O— and/or —S—.

14. A liquid-crystal display according to claim 5, wherein the medium further comprises at least one compound of formula III'

R³(A³—Z³)ₒ—A⁴—R⁴    III' in which

R³ and R⁴ are each, independently of one another, H, an alkyl or alkenyl radical having 1 to 15 carbon atoms which is unsubstituted, monosubstituted by CN or CF₃ or at least monosubstituted by halogen, where, in addition, one or more CH₂ groups in these radical may each, independently of one another, be replaced by —O—, —S—,

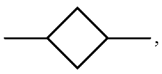

—CO—, —CO—O—, —O—CO— or —O—CO—O— in such a way that O atoms are not linked directly to one another, A³ and A⁴ are each, independently of one another,
(a) 1,4-cyclohexenylene or trans-1,4-cyclohexylene in which, in addition, one or more non-adjacent CH₂ groups may be replaced by —O— and/or —S—,
(b) 1,4-phenylene in which, in addition, one or two CH groups may be replaced by N,
(c) 1,4-bicyclo[2.2.2]octylene, piperidine-1,4-diyl, naphthalene-2,6-diyl, decahydronaphthalene-2,6-diyl and 1,2,3,4-tetrahydronaphthalene-2,6-diyl,
where (a) and (b) may be substituted by one or two fluorine atoms, Z³ is in each case, independently, —CO—O—, —O—CO—, —CH₂O—, —OCH₂—, —CH₂CH₂—, —CH═CH—, —C≡C— or a single bond, or one of the radicals Z¹ and Z² is alternatively —(CH₂)₄— or —CH═CH—CH₂CH₂—, and O is 1, 2 or 3.

15. A liquid crystal medium as claimed in claim 1, comprising at least one compound of formulae Ia, IIb, or IIc,

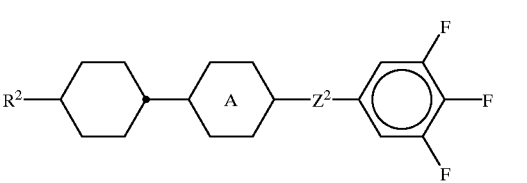

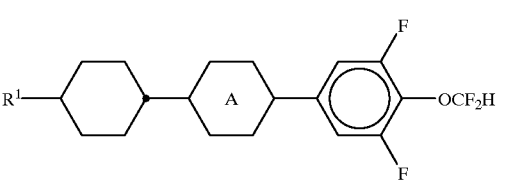

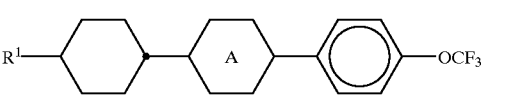

at least one compound selected from the formulae Ia and Ib,

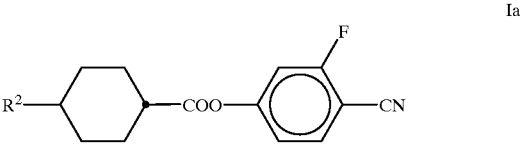

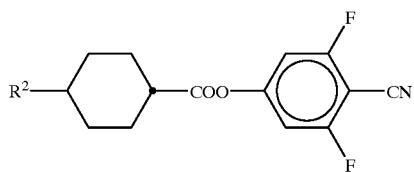

Ib at least one compound of formulae IIIa, IIIb, or IIIc,

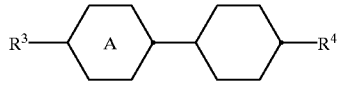

IIIa

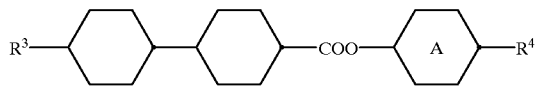

IIIb

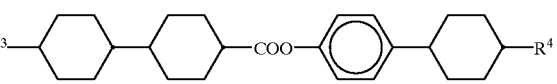

IIIc and additionally
at least one compound of formulae IVa, IVb or IVc

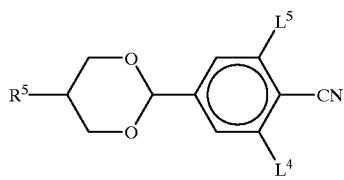

IVa

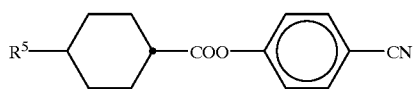

IVb

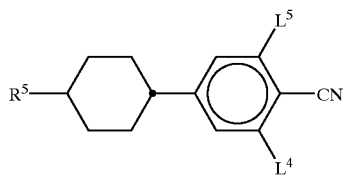

IVc where

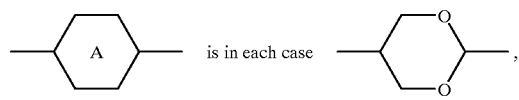

is in each case

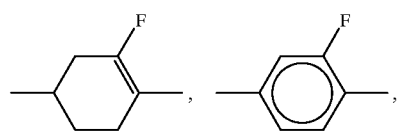

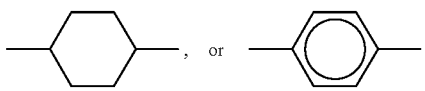

and

—$Z^2$ is —COO—, —$CH_2CH_2$— or a single bond, and $R^2$, $R^3$, $R^4$, and $R^5$ are each independently as defined for $R^1$, and $L^1$, $L^2$, $L^3$, $L^4$, and $L^5$ are each independently H or F.

16. A liquid-crystal display according to claim 5, wherein the medium further comprises at least one compound of formula IV

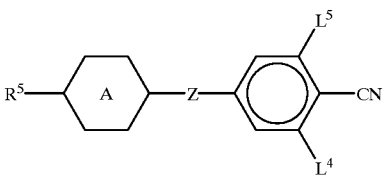

IV in which $R^5$ is H, an alkyl or alkenyl radical having 1 to 15 carbon atoms which is unsubstituted, monosubstituted by CN or $CF_3$ or at least monosubstituted by halogen, where, in addition, one or more $CH_2$ groups in these radicals may each, independently of one another, be replaced by —O—, —S—,

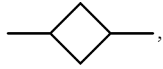

—CO—, —CO—O—, —O—CO— or —O—CO—O— in such a way that O atoms are not linked directly to one another,

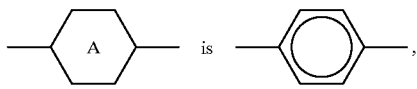

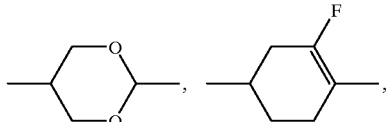

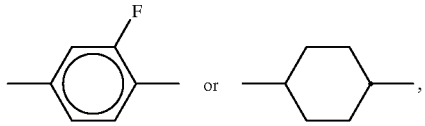

Z is a single bond or —COO—, and $L^4$ and $L^5$ are each, independently of one another, F or H, with the proviso that the compound of formula IV is different from the compound of formula I.

17. A liquid-crystal display according to claim 5, wherein the medium has a dielectric anisotropy $\Delta\epsilon$ of >8.5.

18. A display according to claim 5, wherein the compound of the formula I comprises at least one compound of the group of compounds of formulae Ia and Ib:

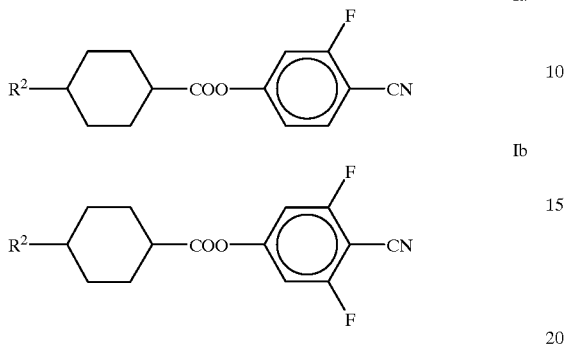

and

R² is H, an alkyl or alkenyl radical having 1 to 15 carbon atoms which is unsubstituted, monosubstituted by CN or CF₃ or at least monosubstituted by halogen, where, in addition, one or more CH₂ groups in these radicals may each, independently of one another, be replaced by —O—, —S—,

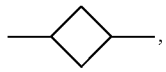

—CO—, —CO—O—, —O—CO— or —O—CO—O— in such a way that O atoms are not linked directly to one another.

19. A display according to claim 5, wherein the compound of tile formula II comprises at least one compound of the group of compounds of formula IIa, IIb, and IIc

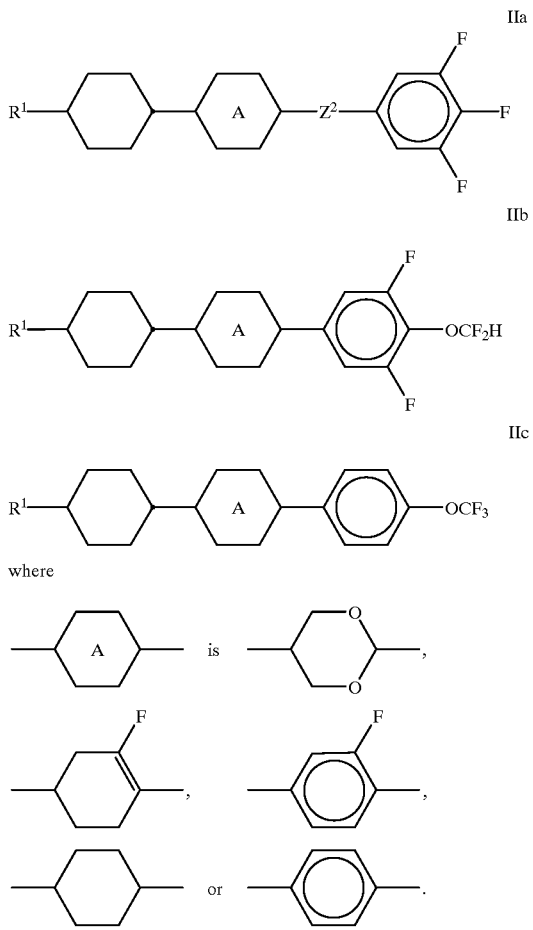

where

* * * * *

UNITED STATES PATENT AND TRADEMARK OFFICE
CERTIFICATE OF CORRECTION

PATENT NO. : 6,342,279 B1
APPLICATION NO. : 08/728370
DATED : January 29, 2002
INVENTOR(S) : Tarumi et al.

It is certified that error appears in the above-identified patent and that said Letters Patent is hereby corrected as shown below:

On the Title page at Item (74) reads Zelane, should read Zelano.

Column 15, line 3 reads $(CEH_2)_r$, should read $(CH_2)_r$.

Column 15, line 28 reads -O or, should read -or, please delete the O.

Signed and Sealed this

Tenth Day of July, 2007

JON W. DUDAS
*Director of the United States Patent and Trademark Office*